United States Patent
Lee et al.

(10) Patent No.: US 9,746,226 B2
(45) Date of Patent: Aug. 29, 2017

(54) REFRIGERATOR

(71) Applicant: LG ELECTRONICS INC., Seoul (KR)

(72) Inventors: Sangbong Lee, Seoul (KR); Jangseok Lee, Seoul (KR); Hyoungkeun Lim, Seoul (KR); Myungjin Chung, Seoul (KR); Minkyu Oh, Seoul (KR); Namsoo Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 302 days.

(21) Appl. No.: 14/531,223

(22) Filed: Nov. 3, 2014

(65) Prior Publication Data

US 2015/0121928 A1    May 7, 2015

(30) Foreign Application Priority Data

Nov. 4, 2013  (KR) .................. 10-2013-0133028
Jan. 27, 2014  (KR) .................. 10-2014-0009603

(51) Int. Cl.
*F25B 49/02*  (2006.01)
*F25B 1/10*  (2006.01)
(Continued)

(52) U.S. Cl.
CPC .............. *F25B 49/02* (2013.01); *F25B 1/005* (2013.01); *F25B 1/10* (2013.01); *F25B 39/02* (2013.01);
(Continued)

(58) Field of Classification Search
CPC .... F25B 1/10; F25B 5/02; F25B 39/02; F25B 49/02; F25B 2400/05; F25D 11/022
(Continued)

(56) References Cited

U.S. PATENT DOCUMENTS

| 3,135,316 A | 6/1964 | Foster et al. |
| 3,427,819 A | 2/1969 | Seghetti |

(Continued)

FOREIGN PATENT DOCUMENTS

| DE | 1 601 014 A1 | 5/1970 |
| EP | 2 530 394 A1 | 12/2012 |

(Continued)

OTHER PUBLICATIONS

United States Office Action dated Jan. 10, 2017 issued in U.S. Appl. No. 14/531,426.
(Continued)

*Primary Examiner* — Marc Norman
(74) *Attorney, Agent, or Firm* — KED & Associates, LLP

(57) ABSTRACT

A refrigerator includes a compressor compressing a refrigerant, a condenser condensing the refrigerant compressed in the compressor, a refrigerant tube guiding a flow of the refrigerant condensed in the condenser, an expansion device decompressing the refrigerant condensed in the condenser, and an evaporator evaporating the refrigerant decompressed in the expansion device. The evaporator includes an evaporation tube through which the refrigerant decompressed in the expansion device flows, a coupling tube through a refrigerant heat-exchanged with the refrigerant of the evaporator flows, and a heat-exchange fin coupled to the evaporation tube and the coupling tube.

18 Claims, 8 Drawing Sheets

(51) Int. Cl.
  *F25B 39/02* (2006.01)
  *F25B 40/00* (2006.01)
  *F25D 11/02* (2006.01)
  *F25D 29/00* (2006.01)
  *F25B 1/00* (2006.01)
  *F25B 5/02* (2006.01)

(52) U.S. Cl.
  CPC ............ *F25B 40/00* (2013.01); *F25D 11/022* (2013.01); *F25D 29/00* (2013.01); *F25B 5/02* (2013.01); *F25B 2600/0251* (2013.01); *F25B 2600/2507* (2013.01); *F25B 2700/2117* (2013.01); *Y02B 40/32* (2013.01)

(58) Field of Classification Search
  USPC .................... 62/113, 151, 513, 524; 165/177
  See application file for complete search history.

(56) References Cited

U.S. PATENT DOCUMENTS

| | | | |
|---|---|---|---|
| 3,645,109 A | 2/1972 | Quick | |
| 3,984,223 A | 10/1976 | Whistler, Jr. | |
| 4,522,037 A | 6/1985 | Ares et al. | |
| 4,918,942 A | 4/1990 | Jaster | |
| 5,157,941 A | 10/1992 | Cur et al. | |
| 5,212,965 A | 5/1993 | Datta | |
| 5,243,837 A * | 9/1993 | Radermacher | F25B 5/04 62/113 |
| 6,185,957 B1 * | 2/2001 | Voss | B60H 1/3227 62/503 |
| 6,289,691 B1 | 9/2001 | Kim et al. | |
| 6,615,610 B1 | 9/2003 | Pettitt et al. | |
| 6,705,107 B2 | 3/2004 | Schlosser et al. | |
| 6,758,054 B2 * | 7/2004 | Zheng | B60H 1/3214 62/199 |
| 8,479,527 B2 | 7/2013 | Song et al. | |
| 2006/0266075 A1 | 11/2006 | Itsuki et al. | |
| 2007/0199335 A1 * | 8/2007 | Innes | F25B 30/02 62/151 |
| 2008/0035318 A1 | 2/2008 | Kamada et al. | |
| 2008/0190125 A1 | 8/2008 | Yoshioka et al. | |
| 2010/0043475 A1 | 2/2010 | Taras et al. | |
| 2013/0312437 A1 | 11/2013 | Davies et al. | |

FOREIGN PATENT DOCUMENTS

| | | |
|---|---|---|
| JP | 2001-124454 A | 5/2001 |
| KR | 10-2006-0069654 A | 6/2006 |
| KR | 10-2007-0027262 A | 3/2007 |
| KR | 10-2008-0107176 A | 12/2008 |
| KR | 10-2012-0054346 A | 5/2012 |
| KR | 10-2013-0088430 A | 8/2013 |
| WO | WO 2012/128610 A1 | 9/2012 |

OTHER PUBLICATIONS

Korean Office Action dated Aug. 11, 2015 issued in Application No. 10-2014-0033317.
European Search Report dated Aug. 24, 2015 issued in Application No. 14191510.8.
European Search Report dated May 8, 2015 issued in Application No. 14191510.8.
U.S. Appl. No. 14/531,426, filed Nov. 3, 2014.
U.S. Office Action dated Jul. 10, 2017 issued in U.S. Appl. No. 14/531,426.

* cited by examiner

REFRIGERATOR

CROSS-REFERENCE TO RELATED APPLICATIONS

This application claims priority under 35 U.S.C. §119 to Korean Application Nos. 10-2013-0133028 filed on Nov. 4, 2013 and 10-2014-0009603 filed on Jan. 27, 2014, whose entire disclosures are incorporated herein by reference.

BACKGROUND

1. Field

The present disclosure relates to a refrigerator.

2. Background

In general, a refrigerator has a plurality of storage compartments for accommodating foods to be stored so as to store the foods in a frozen or refrigerated state. The storage compartment may have one surface that is opened to receive or allow removal of the foods. The plurality of storage compartments include a freezing compartment for storing foods in the frozen state and a refrigerating compartment for storing foods in the refrigerated state.

A refrigeration system in which a refrigerant is circulated is driven in the refrigerator. The refrigeration system may include a compressor, a condenser, an expansion device, and an evaporator. The evaporator may include a first evaporator disposed at a side of the refrigerating compartment and a second evaporator disposed at a side of the freezing compartment.

Cool air stored in the refrigerating compartment may be cooled while passing through the first evaporator, and the cooled cool air may be supplied again into the refrigerating compartment. The cool air stored in the freezing compartment may be cooled while passing through the second evaporator, and the cooled cool air may be supplied again into the freezing compartment. As described above, in the refrigerator according to the related art, independent cooling may be performed in the plurality of storage compartments through separate evaporators.

The compressor may be disposed in a machine room that is disposed in a lower portion of the refrigerator. The machine room may communicate with a space in which the refrigerator is installed, for example, the indoor space and thus be maintained at room temperature.

The refrigerant suctioned into the compressor may increase in superheating degree due to the room temperature. When the superheating degree increases, an overload may be applied to the compressor to increase power consumption.

BRIEF DESCRIPTION OF THE DRAWINGS

The embodiments will be described in detail with reference to the following drawings in which like reference numerals refer to like elements wherein.

DETAILED DESCRIPTION OF THE EMBODIMENTS

Figure 1:
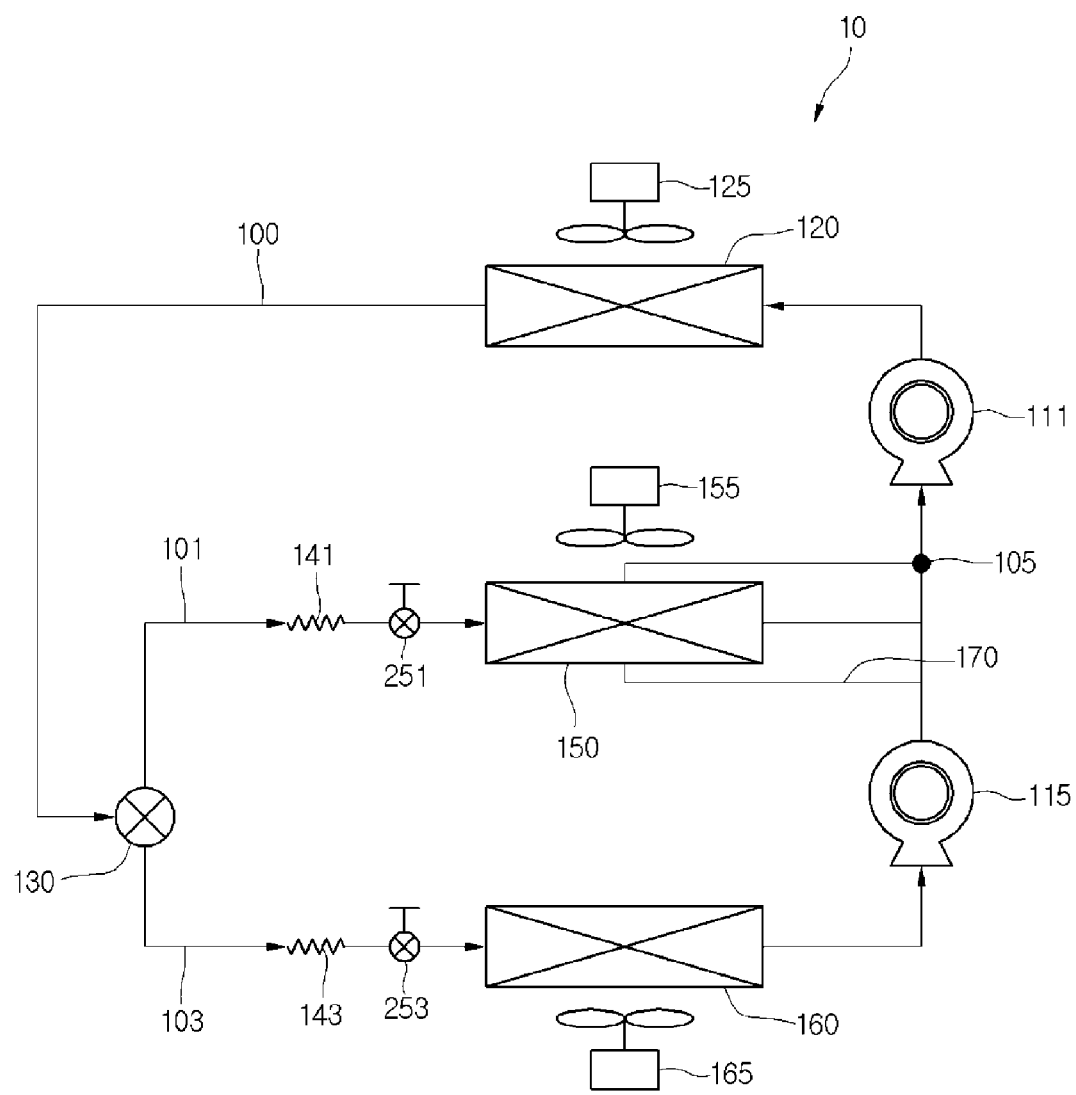
FIG. 1 is a view illustrating a system of a refrigeration cycle in a refrigerator according to a first embodiment.

FIG. 1 is a view illustrating a system of a refrigeration cycle in a refrigerator according to a first embodiment. A refrigerator 10 according to a first embodiment includes a plurality of devices for driving a refrigeration cycle. For example, the refrigerator 10 includes a plurality of compressors 111 and 115 for compressing a refrigerant, a condenser 120 for condensing the refrigerant compressed in the plurality of compressors 111 and 115, a plurality of expansion devices 141 and 143 for decompressing the refrigerant condensed in the condenser 120, and a plurality of evaporators 150 and 160 for evaporating the refrigerant decompressed in the plurality of expansion devices 141 and 143. The refrigerator 10 may also include a refrigerant tube 100 connecting the plurality of compressors 111 and 115, the condenser 120, the expansion devices 141 and 143, and the evaporators 150 and 160 to each other to guide a flow of the refrigerant.

The plurality of compressors 111 and 115 include the compressor 111 and the second compressor 115. The second compressor 115 may be a "low-pressure compressor" that is disposed a low-pressure side to compress the refrigerant in one stage, and the first compressor 111 may be a "high-pressure compressor" for further compressing (a two-stage compression) the refrigerant compressed in the second compressor 115.

The plurality of evaporators 150 and 160 includes a first evaporator 150 for generating cool air to be supplied into one storage compartment of the refrigerating compartment and the freezing compartment and a second evaporator 160 for generating cool air to be supplied into the other storage compartment. The second evaporator 160 is disposed on one side of the first evaporator 150.

For example, the first evaporator 150 may function as a "refrigerating compartment-side evaporator" to generate cold air to be supplied into the refrigerating compartment and be disposed on one side of the refrigerating compartment. Also, the second evaporator 160 may function as a "freezing compartment-side evaporator" to generate cold air to be supplied into the freezing compartment and be disposed on one side of the freezing compartment.

The cool air to be supplied into the freezing compartment may have a temperature less than that of the cool air to be supplied into the refrigerating compartment. A refrigerant evaporation pressure of the second evaporator 160 may be less than that of the first evaporator 150.

An outlet-side refrigerant tube 100 of the second evaporator 160 may extend to an inlet-side of the second compressor 115. Thus, the refrigerant passing through the second evaporator 160 may be introduced into the second compressor 115. The refrigerant tube 100 includes a combination part 105 at which an outlet-side refrigerant tube of the first evaporator 150 and an outlet-side refrigerant tube of the second compressor 115, i.e., a low-pressure discharge tube 170 are combined with each other.

The one-stage compressed refrigerant flowing into the low-pressure discharge tube 170 may be heat-exchanged with the refrigerant of the first evaporator 150. The one-stage compressed refrigerant may have a temperature greater than that of refrigerant of the first evaporator 150. The one-stage compressed refrigerant flowing into the low-pressure discharge tube 170 may be reduced in superheating degree through the heat exchange. For example, the refrigerant passing through the second evaporator 160 may be compressed in the second compressor 115, and then the refrigerant of the first evaporator 150 and the refrigerant of the low-pressure discharge tube 170 may be mixed with each other. Then, the refrigerant may be suctioned into the first compressor 111.

The plurality of expansion devices 141 and 143 include a first expansion device or valve 141 for expanding the refrigerant to be introduced into the first evaporator 150 and a second expansion device or valve 143 for expanding the refrigerant to be introduced into the second evaporator 160. Each of the first and second expansion devices 141 and 143 may include a capillary tube.

When the second evaporator 160 is used as the freezing compartment-side evaporator, and the first evaporator 150 is used as the refrigerating compartment-side evaporator, the capillary tube of the second expansion device 143 may have a diameter less than that of the capillary tube of the first expansion device 141 so that the second evaporator 160 has a refrigerant evaporation pressure less than that of the first evaporator 150.

The refrigerator 10 includes a first refrigerant passage or tube 101 disposed on an inlet-side of the first evaporator 150 to guide the introduction of the refrigerant into the first evaporator 150 and a second refrigerant passage or tube 103 disposed on an inlet-side of the second evaporator 160 to guide the introduction of the refrigerant into the second evaporator 160. The first and second refrigerant passages 101 and 103 may be branched passages of the refrigerant tube 100 and thus be called "first and second evaporation passages," respectively. The first expansion device 141 may be disposed in the first refrigerant passage 102, and the second expansion device 143 may be disposed in the second refrigerant passage 103.

The refrigerator 10 may further include a flow adjustment part or flow adjuster 130 for dividing and introducing the refrigerant into the first and second refrigerant passages 101 and 103. The flow adjustment part 130 may be disposed on a branch part that is branched into the first and second refrigerant passages 101 and 103. The flow adjustment part 130 includes a three-way valve having one inflow part through which the refrigerant is introduced and two discharge parts through which the refrigerant is discharged.

The flow adjustment part 130 may be understood as one evaporator of the first and second evaporators 150 and 160 so that at least one evaporator of the first and second evaporators 150 and 160 is driven, or a device for adjusting a flow of the refrigerant so that the refrigerant is introduced into the first and second evaporators 150 and 160 at the same time.

The first and second refrigerant passages 101 and 103 are connected to the two discharge parts or ports of the flow adjustment part 130, respectively. The refrigerant passing through the flow adjustment part 130 may be divided and discharged into the first and second refrigerant passages 101 and 103. The discharge parts or ports connected to the first and second refrigerant passages 101 and 103 may be called a "first discharge part" and a "second discharge part", respectively.

At least one of the first and second discharge parts may be opened. For example, when both of the first and second discharge parts are opened, the refrigerant may flow through the first and second refrigerant passages 101 and 103. On the other hand, when the first discharge part is opened, and the second discharge part is closed, the refrigerant may flow through the first refrigerant passage 101. Of course, when the first discharge part is closed, and the second discharge part is opened, the refrigerant may flow through only the second refrigerant passage 103.

The refrigerator 10 includes blower fans 125, 155, and 165 disposed on one side of the heat exchanger to blow air. The blower fans 125, 155, and 165 includes a condensation fan 125 provided on one side of the condenser 120, a first evaporation fan 155 provided on one side of the first evaporator 150, and a second evaporation fan 165 provided on one side of the second evaporator 160.

Each of the first and second evaporators 150 and 160 may vary in heat-exchange performance according to a rotation rate of each of the first evaporation fans 155 and 165. For example, if a large amount of refrigerant is required according to the operation of the first or second evaporator 150 or 160, the first or second evaporation fan 155 or 166 may increase in rotation rate. If the cool air is sufficient, the first or second evaporation fan 155 or 165 may be reduced in rotation rate.

The refrigerator 10 includes flow rate adjustment parts or valves 251 and 253 for adjusting a flow of the refrigerant. The flow rate adjustment parts 251 and 253 may be disposed in at least one refrigerant passage of the first and second refrigerant passages 101 and 103. For example, the flow rate adjustment parts 251 and 253 may include a first flow rate adjustment part 251 disposed in the first refrigerant passage 101 and a second flow rate adjustment part 253 disposed in the second refrigerant passage 103.

Each of the first and second flow rate adjustment parts 251 and 253 may include an electric expansion valve (EEV) of which a degree or amount of opening of the valve or the flow rate is adjustable. If the opening degree of the first or second flow rate adjustment part 251 or 253 decreases, an amount of refrigerant flowing through an opening having a decreasing size may decrease. On the other hand, if the opening degree of the first or second flow rate adjustment part 251 or 253 increases, an amount of refrigerant flowing through an opening having an increased size may increase.

For example, if the opening degree of the first flow rate adjustment part 251 is relatively greater than that of the second flow rate adjustment part 253, a more amount of refrigerant may flow into the first refrigerant passage 101, and thus an amount of refrigerant introduced into the first evaporator 150 may increase. On the other hand, if the opening degree of the first flow rate adjustment part 251 is relatively less than that of the second flow rate adjustment part 253, a more amount of refrigerant may flow into the second refrigerant passage 103, and thus an amount of refrigerant introduced into the second evaporator 160 may increase.

Since the first and second flow rate adjustment parts 251 and 253 are provided, the opening degree of each of the refrigerant passages may be finely adjustable. Thus, an amount of refrigerant to be introduced into the first or second evaporator 150 or 160 may be finely adjustable. As a result, while the first and second evaporators 150 and 160 operate, a refrigerant concentration into the first or second evaporator 150 or 160 may be prevented.

Although the first and second flow rate adjustment parts 251 and 253 are respectively disposed in the first and second refrigerant passages 101 and 103 in FIG. 1, the present disclosure is not limited thereto. For example, one flow rate adjustment part may be disposed in the first or second refrigerant passage 103 or 103 in an alternative embodiment. Since the flow rate adjustment part is provided in one refrigerant passage to adjust the opening degree, an amount of refrigerant passing through the other refrigerant passage may be relatively adjustable. If the opening degree of the flow rate adjustment part increases, an amount of refrigerant passing through the other refrigerant passage may decrease. On the other hand, if the opening degree of the flow rate adjustment part decreases, an amount of refrigerant passing through the other refrigerant passage may increase.

Figure 2:
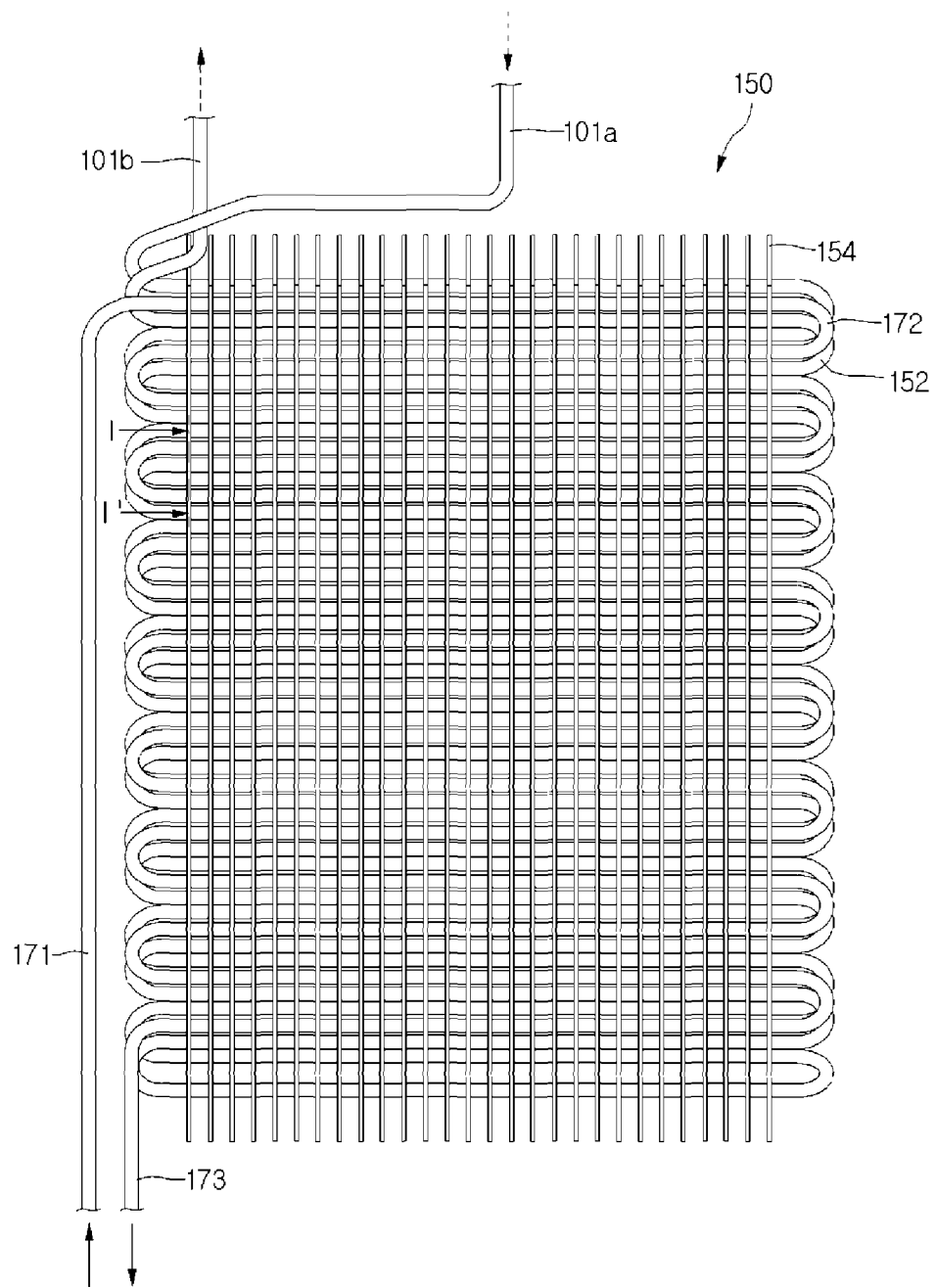
FIG. 2 is a cross-sectional view illustrating a structure of an evaporator according to the first embodiment.
Figure 3:
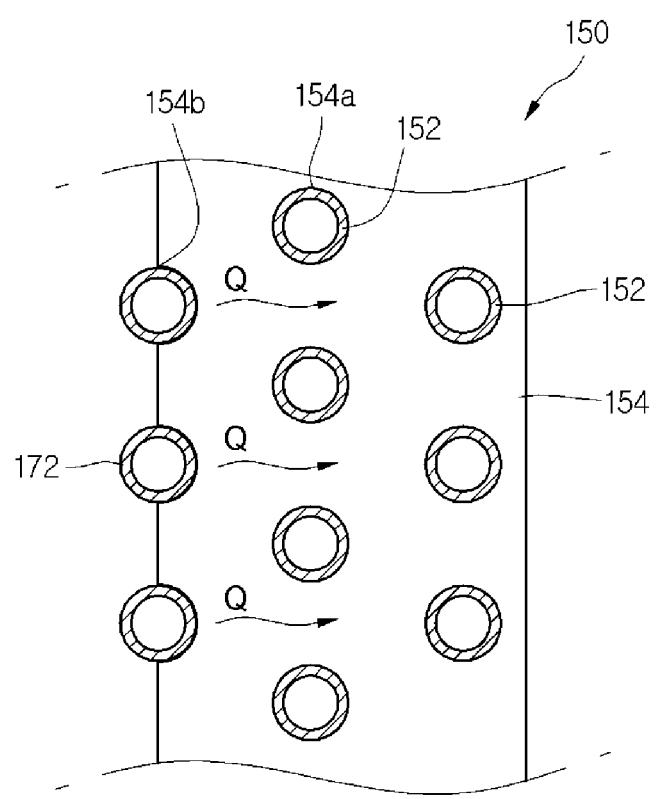
FIG. 3 is a cross-sectional view taken along line I-I' of FIG. 2.

FIG. 2 is a cross-sectional view illustrating a structure of an evaporator according to the first embodiment, and FIG. 3 is a cross-sectional view taken along line I-I' of FIG. 2. The first evaporator 150 according to the first embodiment includes an evaporation tube 152 in which the refrigerant decompressed in the first expansion device 141 flows and a plurality of heat-exchange fins 154 (hereinafter, referred to as a "fin") that are coupled to the evaporation tube 152 to increase a heat-exchange area.

The plurality of fins 154 may be spaced apart from each other and be coupled to the evaporation tube 152. The evaporation tube 152 may pass through the plurality of fins 154. When the first evaporation fan 155 operates, cool air within the refrigerator may pass through the first evaporator 150 and then be heat-exchanged with the refrigerant of the evaporation tube 152. Each of the fins 154 may provide a heat-exchange surface between the cool air and the refrigerant.

An inlet-side of the first evaporator 150 includes an evaporator inlet tube 101a for guiding the introduction of the refrigerant into the first evaporator 150 and an evaporator outlet tube 101b for guiding the discharge of the refrigerant passing through the first evaporator 150. The evaporator inlet tube 101a and the evaporator outlet tube 101b may constitute a portion of the first refrigerant passage 101.

The refrigerator 10 includes a heat-exchange inlet tube 171 for guiding the refrigerant flowing into the low-pressure discharge tube 170 into one side of the fin 154, a heat-exchange tube 172 extending from the heat-exchange inlet tube 171 and then coupled to the fin 154 and which is heat-exchanged with the refrigerant of the evaporation tube 152, and a heat-exchange outlet tube 173 for guiding the refrigerant passing through the heat-exchange tube 172 into the combination part 105. The heat-exchange inlet tube 171, the heat-exchange tube 172, and the heat-exchange outlet tube 173 may constitute a portion of the low-pressure discharge tube 170.

The fin 154 of the first evaporator 150 includes a plurality of insertion parts or tubes 154a and 154b. The plurality of insertion parts 154a and 154b include a first insertion part or tube 154a coupled to the evaporation tube 152 and a second insertion part or tube 154b coupled to the heat-exchange tube 172.

For example, as illustrated in FIG. 3, the first insertion part 154a may have a through-hole shape through which at least one portion of the fin 154 passes. Also, the second insertion part 154b may have a recess or groove shape that is recessed from an edge of the fin 154 in one direction. However, the present disclosure is not limited thereto. For example, the second insertion part 154b may have a through-hole shape that is similar to that of the first insertion part 154a.

As described above, since the heat-exchange tube 172 is coupled to the fin 154, the refrigerant of the low-pressure discharge tube 170 may be easily cooled by the refrigerant of the evaporation tube 152 and the cool air flowing around the first evaporator 150.

In summary, the refrigerant that is one-stage compressed in the second compressor 115 may be cooled by the first evaporator 150 to reduce the superheating degree of the one-stage compressed refrigerant. Since the refrigerant having the reduced superheating degree is suctioned into the first compressor 111 and two-stage compressed, the load applied to the first compressor 111 may be reduced to decrease the power consumption.

Hereinafter, a description will be made according to a second embodiment. Since the current embodiment is the same as the first embodiment except for portions of the constitutions, different parts between the first and second embodiments will be described principally, and descriptions of the same parts will be denoted by the same reference numerals and descriptions of the first embodiment.

Figure 4:
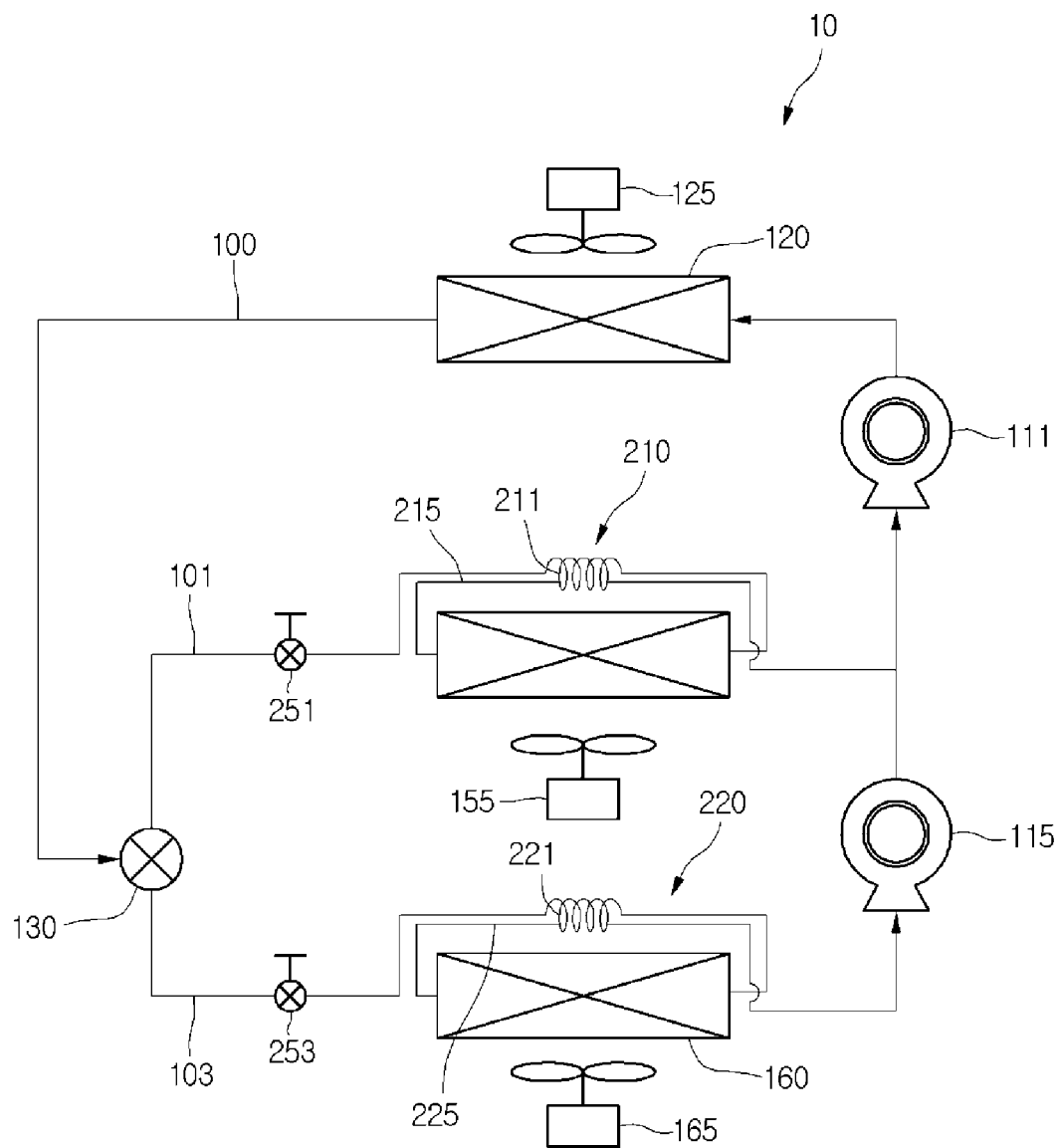
FIG. 4 is a view illustrating a system having a refrigeration cycle in a refrigerator according to a second embodiment.

FIG. 4 is a view illustrating a system having a refrigeration cycle in a refrigerator according to a second embodiment. A refrigerator 10 according to a second embodiment includes a first suction assembly 210 coupled to a first evaporator 150 and heat-exchanged with a refrigerant of the first evaporator 150 and a second suction assembly 220 coupled to a second evaporator 160 and heat-exchanged with a refrigerant of the second evaporator 160.

The first suction assembly 210 includes a first expansion device or valve 211 decompressing a refrigerant flowing into a first refrigerant passage or tube 101 and a first suction tube 215 guiding the refrigerant passing through the first evaporator 150 into the first compressor 111. The first compressor 111 is coupled to the first suction tube 215. The first expansion device 211 and the first suction tube 215 may be coupled to each other through a coupling part or coupler (see reference numeral 217 of FIG. 7). The coupling part 217 may be formed by soldering.

The second suction assembly 220 includes a second expansion device or valve 221 decompressing a refrigerant flowing into a second refrigerant passage 103 and a second suction tube 225 guiding the refrigerant passing through the second evaporator 160 into the second compressor 115. The second compressor 115 is coupled to the second suction tube 225. Similarly, the second expansion device or valve 221 and the second suction tube 225 may be coupled to each other through a coupling part. The coupling part may be formed by soldering. Each of the first and second expansion devices 211 and 221 may include a capillary tube.

The first flow rate adjustment part 251 that is described in the first embodiment may be disposed on an inlet-side of the first expansion device 211. Also, a second flow rate adjustment part 253 may be disposed on an inlet-side of the second expansion device 221.

The refrigerant passing through the first expansion device 211 may have a temperature greater than that of refrigerant of the first evaporator 150. Thus, while the first suction assembly 210 is heat-exchanged with the first evaporator 150, the refrigerant of the first expansion device 211 may be cooled.

The refrigerant after passing through the first expansion device 211 may have a dryness fraction less than that of the refrigerant introduced into the first evaporator 150. As a result, the refrigerant having the low dryness fraction may be introduced into the first evaporator 150 to improve evaporation efficiency. The refrigerant suctioned into the first compressor 111 after being evaporated in the first evaporator 150 may be reduced in suction dryness fraction. Thus, a load applied to the first compressor 111 may be reduced to decrease power consumption.

The refrigerant passing through the second expansion device 221 may have a temperature greater than that of refrigerant of the first evaporator 160. Thus, while the second suction assembly 220 is heat-exchanged with the second evaporator 160, the refrigerant of the second expansion device 221 may be cooled. The refrigerant after passing through the second expansion device 221 may have a dryness fraction less than that of the refrigerant introduced into the second evaporator 160. As a result, the refrigerant having the low dryness fraction may be introduced into the second evaporator 160 to improve evaporation efficiency.

The refrigerant suctioned into the second compressor 115 after being evaporated in the second evaporator 160 may be reduced in suction dryness fraction (a horizontal movement of a low-pressure refrigerant diagram in a P—H diagram). A load applied to the second compressor 115 may be reduced to decrease power consumption.

The refrigerant that is one-stage compressed in the second compressor 115 may be mixed with the refrigerant passing through the first evaporator 150 and then be suctioned into the first compressor 111.

Figure 5:
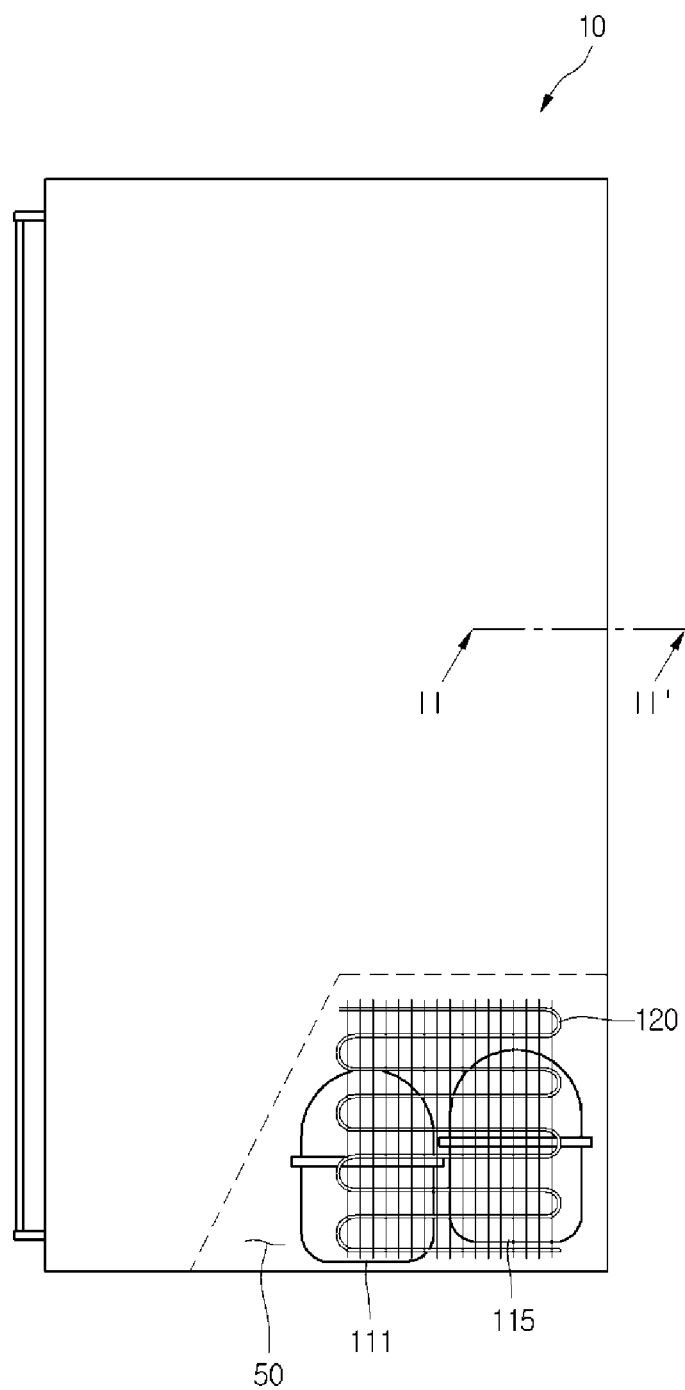
FIG. 5 is a view illustrating a configuration of a refrigerator according to a second embodiment.
Figure 6:
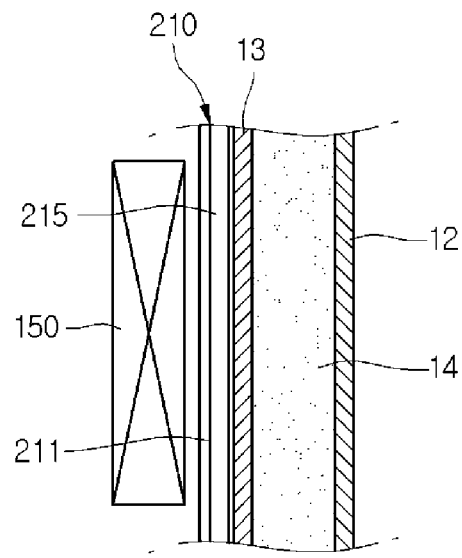
FIG. 6 is a cross-sectional view taken along line II-II' of FIG. 5.
Figure 7:
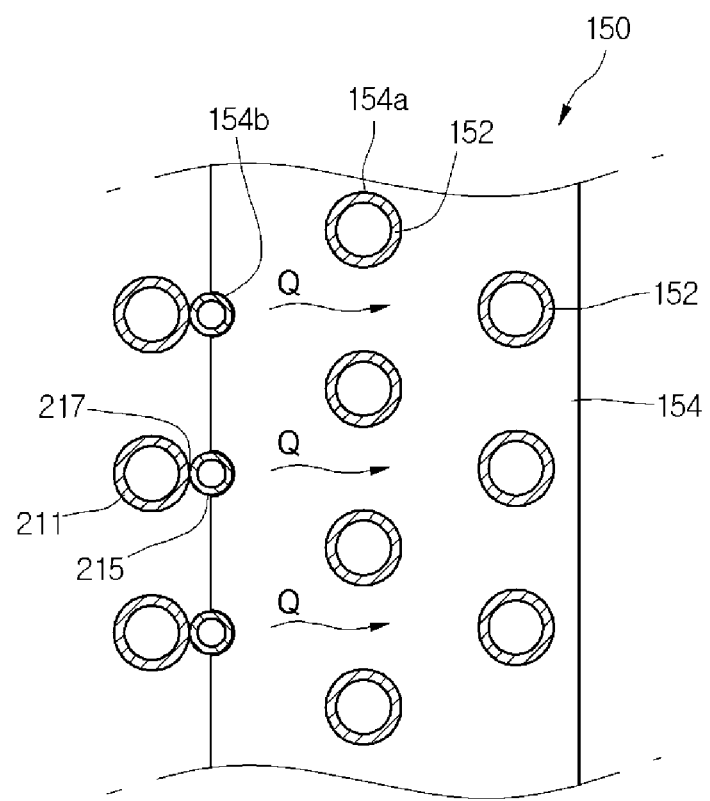
FIG. 7 is a cross-sectional view illustrating a structure of an evaporator according to the second embodiment.

FIG. 5 is a view illustrating a configuration of the refrigerator according to a second embodiment, FIG. 6 is a cross-sectional view taken along line II-II' of FIG. 5, and FIG. 7 is a cross-sectional view illustrating a structure of the evaporator according to the second embodiment. The refrigerator 10 according to the second embodiment includes a main body 11 defining a refrigerating compartment and a freezing compartment. A machine room 50 in which the first compressor 111, the second compressor 115, and a condenser 120 are installed may be defined in a lower portion of the main body 11. The main body 11 also includes an outer case 12 defining an exterior of the refrigerator 10, an inner case 13 coupled to the inside of the outer case 12, and an insulation material 14 disposed between the outer case 12 and the inner case 13.

The first evaporator 150 is disposed inside the inner case 13. Although only a peripheral structure of the first evaporator 150 is illustrated in FIG. 6, the second evaporator 160 may be disposed inside the inner case 13. Description with respect to a peripheral structure of the second evaporator 160 may be similarly described as the first evaporator 150.

The first suction assembly 210 is disposed between the first evaporator 150 and the inner case 13. For example, the first suction tube 215 of the first suction assembly 210 may be disposed on a side of the inner case 13, and the first expansion device 211 may be coupled to the first evaporator 150.

Although not shown, the second suction assembly 220 is disposed between the second evaporator 160 and the inner case 13. For example, the second suction tube 225 of the second suction assembly 220 may be disposed on a side of the inner case 13, and the second expansion device 221 may be coupled to the second evaporator 160.

The first evaporator 150 includes an evaporation tube 152 and a plurality of fins 154 coupled to the evaporation tube. Each of the fins 154 includes a plurality of insertion parts or tubes 154*a* and 154*b*. The plurality of insertion parts 154*a* and 154*b* include a first insertion part or tube 154*a* coupled to the evaporation tube 152 and a second insertion part or tube 154*b* coupled to at least one portion of the first suction assembly 210.

For example, as illustrated in FIG. 7, the first insertion part 154*a* may have a through-hole shape through which at least one portion of the fin 154 passes. The second insertion part 154*b* may have a recess or groove shape that is recessed from an edge of the fin 154 in one direction. However, the present disclosure is not limited thereto. For example, the second insertion part 154*b* may have a through-hole shape that is similar to that of the first insertion part 154*a*.

The heat-exchange tube 172 described in the first embodiment and the first suction assembly 210 described in the current embodiment may be called a "coupling tube" in that they are coupled to the fin of the evaporator. As described above, since the first suction assembly 210 is coupled to the fin 154, the refrigerant flowing into the first expansion device 211 may be easily cooled by the refrigerant of the evaporation tube 152 and the cool air flowing around the first evaporator 150.

In summary, the refrigerant flowing into the first expansion device 211 may be cooled by the first evaporator 150 to allow the refrigerant to phase-change in a direction in which the dryness fraction is reduced while the refrigerant is decompressed. As a result, the refrigerant after passing through the first expansion device 211 may have a dryness fraction less than that of the refrigerant introduced into the first evaporator 150 to improve heat-exchange efficiency of the first evaporator 150. Since a temperature of the refrigerant, i.e., a suction temperature (suction superheating degree) of the first compressor 111 is reduced after the refrigerant having a relatively low dryness fraction is evaporated, a work amount of the compressor may be reduced to decrease the power consumption.

Although not shown, the second suction assembly 220 may be coupled to the fin of the second evaporator 160, and thus the second expansion device 221 may be cooled. Thus, the refrigerant introduced into the second evaporator 160 may have the relatively low dryness fraction to improve the heat-exchange efficiency of the second evaporator 160. Also, since a suction temperature (suction superheating degree) of the second compressor 115 is reduced, a required work amount may be reduced to decrease the power consumption.

Hereinafter, a description will be made according to a third embodiment. The current embodiment relates to a control technology for controlling an amount of refrigerant to be introduced into a first or second evaporator. The components constituting the cycle of the refrigerator will be described with reference to the description of FIG. 1.

Figure 8:
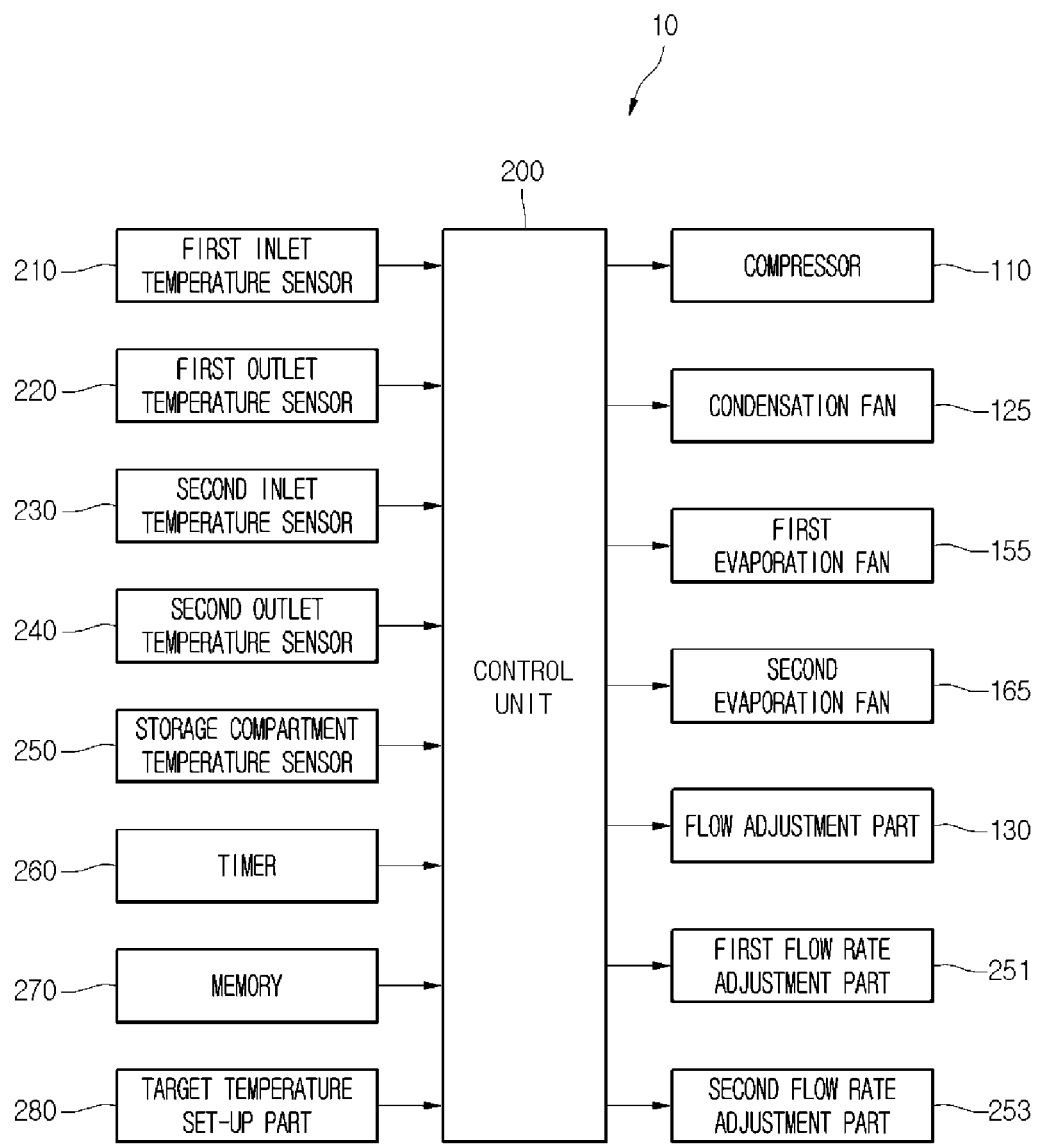
FIG. 8 is a block diagram illustrating constitutions of a refrigerator according to a third embodiment.
Figure 9:
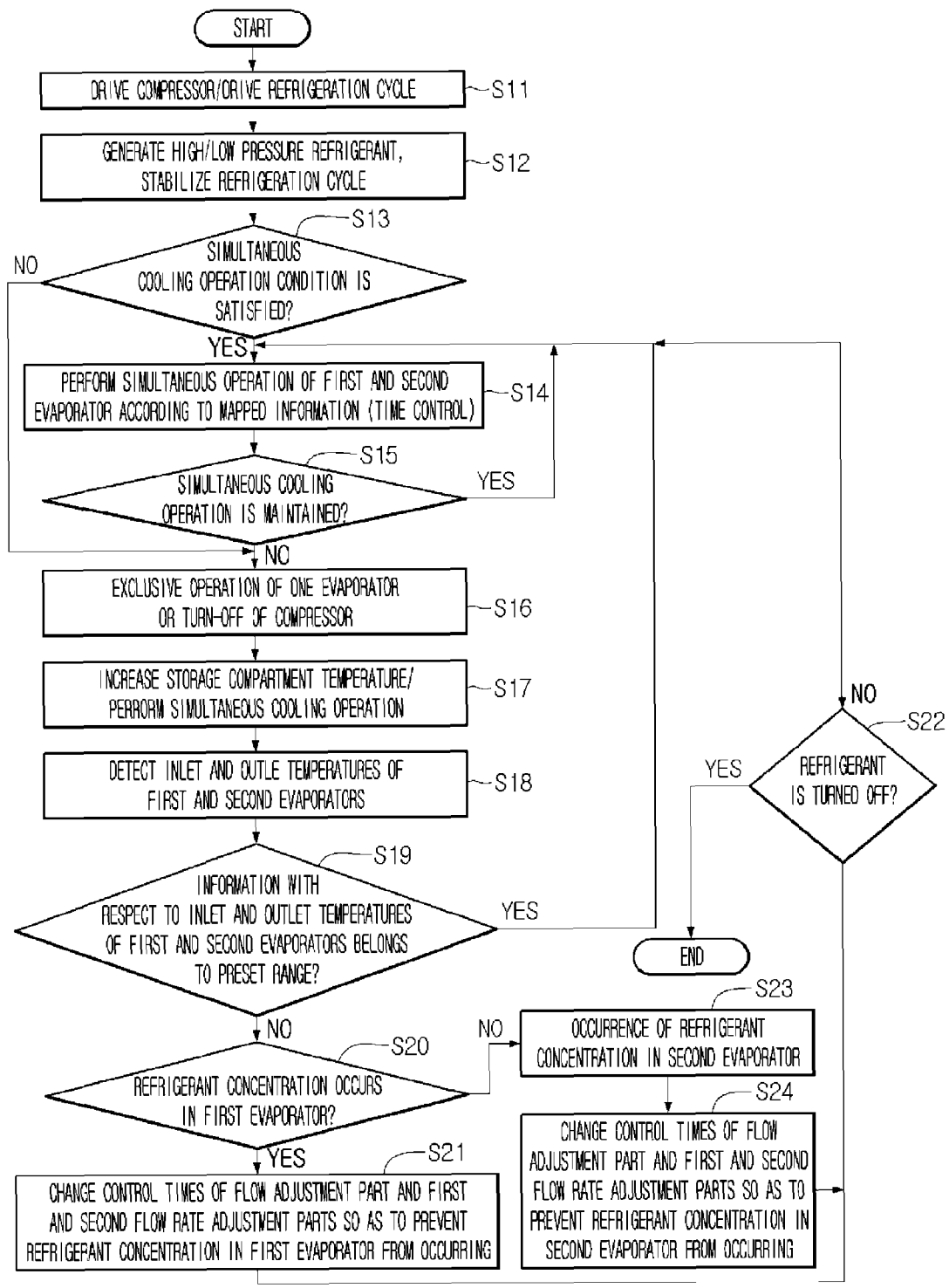
FIG. 9 is a flowchart illustrating a method for controlling the refrigerator according to the third embodiment.

FIG. 8 is a block diagram illustrating various elements of a refrigerator according to a third embodiment, and FIG. 9 is a flowchart illustrating a method for controlling the refrigerator according to the third embodiment. The refrigerator 10 according to the current embodiment includes a plurality of temperature sensors 210, 220, 230, and 240 for detecting inlet or outlet temperatures of each of the first and second evaporators 150 and 160.

The plurality of temperature sensors 210, 220, 230, and 240 include a first inlet temperature sensor 210 for detecting an inlet-side temperature of the first evaporator 150 and a first outlet temperature sensor 220 for detecting an outlet-side temperature of the first evaporator 150. The plurality of temperature sensors 210, 220, 230, and 240 include a second inlet temperature sensor 230 for detecting an inlet-side temperature of the second evaporator 160 and a second outlet temperature sensor 240 for detecting an outlet-side temperature of the second evaporator 160.

The refrigerator 10 may further include a control unit 200 for controlling an operation of the flow adjustment part or controller 130 on the basis of the temperatures detected by the plurality of temperature sensors 210, 220, 230, and 240. To perform simultaneous cooling operations of the refrigerating and freezing compartments, the control unit 200 may control operations of the compressor 110, the condensation fan 125, and the first and second evaporation fans 155 and 165. The compressor 110 includes a first compressor 111 and a second compressor 115.

The refrigerator 10 includes a storage compartment temperature sensor 250 detecting an inner temperature of the refrigerator storage compartment. The storage compartment temperature sensor includes a refrigerating compartment temperature sensor disposed in the refrigerating compartment to detect an inner temperature of the refrigerating compartment and a freezing compartment temperature sensor disposed in the freezing compartment to detect an inner temperature of the freezing compartment.

The refrigerator 10 also includes a target temperature set-up part or circuit/interface 280 for inputting a target temperature of the refrigerating compartment or the freezing compartment. For example, the target temperature set-up part 280 may be disposed on a position which is easily manipulated by a user on a front surface of the refrigerating compartment door or the freezing compartment door.

The information inputted through the target temperature set-up part 280 may become control reference information of the compressor 110, the plurality of blower fans 125, 155, and 165, and the flow adjustment part 130. The control unit 200 may determine the simultaneous cooling operation of the refrigerating compartment and the freezing compartment, an exclusive operation of one storage compartment, or turn-off of the compressor 110 on the basis of the information inputted by the target temperature set-up part 280 and the information detected by the storage compartment temperature sensor 250.

For example, if the inner temperatures of the refrigerating compartment and the freezing compartment are higher than that inputted by the target temperature set-up part 280, the control unit 200 may control the compressor 110 and the flow adjustment part 130 to perform the simultaneous cooling operation.

On the other hand, if the inner temperature of the freezing compartment is higher than that inputted by the target temperature set-up part 280, and the inner temperature of the refrigerating compartment is lower than that inputted by the target temperature set-up part 280, the control unit 200 may control the compressor 110 and the flow adjustment part 130 to perform an exclusive cooling operation for the freezing compartment.

When the inner temperatures of the refrigerating compartment and the freezing compartment are lower than that inputted by the target temperature set-up part 280, the control unit 200 may turn the compressor 110 off.

The refrigerator may further include a timer 260 for integrating a time elapsing value for the operation of the flow adjustment part 130 while the simultaneous cooling operation of the refrigerating compartment and the freezing compartment is performed. For example, the timer 240 may integrate a time that elapses in a state where all of the first and second refrigerant passages 101 and 103 are opened or a time that elapses in a state where one of the first and second refrigerant passages 101 and 103 is opened.

The refrigerator 10 may further include a memory unit or memory for mapping time values with respect to the adjusted states of the flow adjustment part 130 and the first and second flow rate adjustment parts 251 and 253 to previously store the mapped values while the simultaneous cooling operation of the refrigerating compartment and the freezing compartment is performed.

In detail, in the current embodiment, information mapped as shown in Table 1 below may be stored in the memory unit 250.

TABLE 1

| Refrigerant concentration | Case 1 | Case 2 |
|---|---|---|
| Simultaneous cooling operation start (reference value) | 90 seconds | 90 seconds |
| When refrigerant concentration occurs in first evaporator | 90 seconds | 120 seconds |
| When refrigerant concentration occurs in second evaporator | 90 seconds | 60 seconds |

Referring to Table 1 above, the "case 1" may be understood as a first control state (an adjusted state) of the flow adjustment part 130 and the first and second flow adjustment parts 251 and 252, i.e., a state in which an amount of refrigerant flowing into the first refrigerant passage 101 is greater than that of refrigerant flowing into the second refrigerant passage 103. For example, the case 1 may be a state in which the flow adjustment part 130 is adjusted to open all of the first and second refrigerant passages 101 and 103, and an opening degree of the first flow rate adjustment part 251 is adjusted so that the opening degree of the first flow rate adjustment part 251 is greater than that of the second flow rate adjustment part 253.

The case 1 may include a state in which the first flow rate adjustment part 251 is opened, and the second flow rate adjustment part 253 is closed in the state where the opening degree of the first flow rate adjustment part 251 is greater than that of the second flow rate adjustment part 253 or a state in which the opening degree of the first flow rate adjustment part 251 is greater than that of the second flow rate adjustment part 253 in the state where all of the first and second flow rate adjustment parts 251 and 253 are opened.

On the other hand, the "case 2" may be understood as a second control state (an adjusted state) of the flow adjustment part 180 and the first and second flow adjustment parts 251 and 252, i.e., a state in which an amount of refrigerant flowing into the second refrigerant passage 103 is greater than that of refrigerant flowing into the first refrigerant passage 101. In detail, the case 2 may be a state in which the flow adjustment part 130 is adjusted to open all of the first and second refrigerant passages 101 and 103, and an opening degree of the second flow rate adjustment part 253 is adjusted so that the opening degree of the second flow rate adjustment part 253 is greater than that of the first flow rate adjustment part 251.

The case 2 may include a state in which the second flow rate adjustment part 253 is opened, and the first flow rate adjustment part 251 is closed in the state where the opening degree of the second flow rate adjustment part 253 is greater than that of the first flow rate adjustment part 251 or a state in which the opening degree of the second flow rate adjustment part 253 is greater than that of the first flow rate adjustment part 251 in the state where all of the first and second flow rate adjustment parts 251 and 253 are opened.

For example, if the simultaneous cooling operation conditions are satisfied, it may be determined that the cooling operation is required for all of the refrigerating compartment and the freezing compartment. Thus, the simultaneous cooling operation may start. Here, the control unit 200 may maintain the first control state for about 90 seconds, and then maintain the second control state for about 90 seconds. The first and second control states may be alternately performed if it is unnecessary to perform the simultaneous cooling operation.

While the first and second control states are repeatedly performed, when the inner temperature of the refrigerating compartment or the freezing compartment reaches a target temperature, the supply of the refrigerant into at least one evaporator may be stopped (exclusive one evaporator operation). Also, when all of the inner temperatures of the refrigerating compartment and the freezing compartment reach the target temperature, the compressor 110 may be turned off.

When the exclusive one evaporator operation or the turn-off of the compressor 110 are maintained for a predetermined time, and it is need to perform the simultaneous cooling operation of the refrigerating compartment and the freezing compartment, the control unit 200 may determine whether refrigerant concentration in the first or second evaporator 150 or 160 occurs on the basis of the temperature values detected by the temperature sensors 210, 220, 230, and 240.

If it is determined that the refrigerant concentration in the first evaporator 150 occurs, the control unit 200 may change the time values according to the first and second cases 1 and 2 to apply the changing time values. That is, when the refrigerant concentration in the first evaporator occurs, since a time for supplying the refrigerant into the second evaporator 160 has to relatively increase, a control time with respect to the case 2 may increase (about 120 seconds).

On the other hand, when the refrigerant concentration in the second evaporator occurs, since a time taken to supply the refrigerant into the first evaporator 150 has to relatively increase, a control time with respect to the case 2 may decrease (about 60 seconds).

If it is determined that the refrigerant concentration in one evaporator occurs, the control time with respect to the case 2 may be adjusted to prevent the refrigerant concentration in the evaporator from occurring. Here, it may be determined that a cooling load of the storage compartment in which the second evaporator 160 is disposed is less than that of the storage compartment in which the first evaporator 150 is disposed.

As a result, the control time with respect to the case 1 for increasing the supply of the refrigerant into the storage compartment having the relatively large cooling load may be fixed, and the control time with respect to the case 2 for increasing the supply of the refrigerant into the storage compartment having the relatively small cooling load may be changed. Thus, the storage compartment having the large cooling load may be stably maintained in cooling efficiency.

The control time of the flow adjustment part 130 and the first and second flow rate adjustment parts 251 and 253 according to the case 1 is called a "first set-up time", and the control time of the flow adjustment part 130 and the first and second flow rate adjustment parts 251 and 253 is called a "second set-up time".

In Table 1 above, the information with respect to the time value for successively performing the cases 1 and 2 while the simultaneous cooling operation is performed and the changing time for successively performing the cases 1 and 2 when the refrigerant concentration in the one evaporator occurs may be obtained through repeated experiments.

Referring to FIG. 8, a method for controlling the refrigerator according to the current embodiment will be described. To drive the refrigerator, the first and second compressor 111 and 115 are driven. A refrigeration cycle according to the compression-condensation-expansion-evaporation of the refrigerant may operate according to the driving of the compressor 110. The refrigerant evaporated in the second evaporator 160 may be compressed in the second compressor 115, and the compressed refrigerant may be mixed with the refrigerator evaporated in the first evaporator 150, and then, the mixture may be introduced into the first compressor 111 (S11).

The simultaneous cooling operation of the refrigerating compartment and the freezing compartment may be initially performed according to the operation of the refrigeration cycle. When a predetermined time elapses, a pressure value according to the refrigerant circulation may reach a preset range. That is, a high pressure of the refrigerant discharged from the first and second compressors 111 and 115 and a low pressure of the refrigerant discharged from the first and second evaporators 150 and 160 may be set within the present range.

When the high and low pressures of the refrigerant are set within the preset range, the refrigeration cycle may be stabilized to continuously operate. Here, a target temperature of the storage compartment of the refrigerator may be previously set (S12).

While the refrigeration cycle operates, it is determined whether the simultaneous cooling operation conditions of the refrigerating compartment and the freezing compartment are satisfied. For example, if it is determined that the inner temperature of the refrigerating compartment and the freezing compartment is above the target temperature through the value detected by the storage compartment temperature sensor 250, the simultaneous cooling operation of the refrigerating compartment and the freezing compartment may be performed (S13).

When the simultaneous cooling operation is performed, the simultaneous operation of the first and second evaporators 150 and 160 may be performed according to the previously mapped information. That is, the flow adjustment part 130 may be controlled in operation to simultaneously supply the refrigerant into the first and second evaporators 150 and 160.

As shown in Table 1 above, in the flow adjustment part 130 and the first and second flow rate adjustment parts 251 and 253, the first adjustment state according to the case 1 may be maintained for about 90 seconds, and the second adjustment state according to the case 2 may be maintained for about 90 seconds. A time control operation for preventing the refrigerant concentration into the second evaporator 160 from occurring is performed firstly according to the case 1, and then a time control operation for preventing the refrigerant concentration into the first evaporator 150 from occurring is performed according to the case 2 (S14).

When the simultaneous cooling operation according to the cases 1 and 2 is performed at least one time, it is determined whether the simultaneous cooling operation of the refrigerating compartment and the freezing compartment has to be maintained. In detail, whether the temperature of the refrigerating compartment or the freezing compartment reaches the target temperature may be detected through the storage compartment temperature sensor 250.

If the temperature of the refrigerating compartment or the freezing compartment reaches the target temperature, it may be unnecessary to perform the cooling of the corresponding storage compartment, and thus it may be unnecessary to perform the simultaneous cooling operation.

When the exclusive cooling operation of the storage compartment, which does not reach the target temperature (i.e., the exclusive cooling operation of the evaporator of the corresponding storage compartment is performed), or all of the storage compartments reach the target temperature, the compressor 110 may be turned off.

On the other hand, when the temperatures of the refrigerating compartment and the freezing compartment do not reach the target temperature, the process may return to the operation S14 to perform the simultaneous operation of the first and second evaporators 150 and 160 again. The simultaneous operation may be repeatedly performed until at least one of the refrigerating compartment and the freezing compartment reaches the target temperature.

As described above, while the simultaneous operation of the first and second evaporators 150 and 160 is performed, the controls of the flow adjustment part 130 and the first and second flow rate adjustment parts 251 and 253 according to the cases 1 and 2 may be successively performed to prevent the refrigerant concentration from occurring in the first and second evaporators 150 and 160, thereby improving the cooling efficiency of the storage compartment and the operation efficiency of the refrigerator (S15 and S16). In step S16, when a time elapses in the state where the exclusive operation of one evaporator is performed, or the compressor 110 is turned off, the refrigerating compartment and the freezing compartment may increase in temperature.

When the temperature of the refrigerating compartment or the freezing compartment increase to a temperature out of the target temperature range, it may be necessary to cool the storage compartment that increases in temperature or to operate the compressor 110 that is in the turn-off state. The simultaneous cooling operation of the refrigerating compartment and the freezing compartment may be performed again (S17). While the simultaneous cooling operation is performed again, change in the control times of the flow adjustment part 130 and the first and second flow rate adjustment parts 251 and 253 according to the cases 1 and 2 may be determined.

For example, the inlet and outlet temperatures of the first evaporator 150 may be detected by the first inlet and outlet temperature sensors 210 and 220. The inlet and outlet temperatures of the second evaporator 160 may also be detected by the second inlet and outlet temperature sensors 230 and 240 (S18).

The control unit 200 may determine an inlet/outlet temperature difference value of the first evaporator 150 and an inlet/outlet temperature difference value of the second evaporator 160. When an amount of refrigerant introduced into the first or second evaporator 150 or 160 is above an adequate refrigerant amount, the difference value between the inlet and outlet temperatures of the first or second evaporator 150 and 160 may decrease. On the other hand, when an amount of refrigerant introduced into the first or second evaporator 150 or 160 is below the adequate refrigerant amount, the difference value between the inlet and outlet temperatures of the first or second evaporator 150 or 160 may increase.

The control unit 200 may determine whether information with respect to the difference value between the inlet and outlet temperatures of the first or second evaporator 150 or 160 belongs to a preset range. The control unit 200 may determine whether an amount of refrigerant flowing into the first or second evaporator 150 or 160 is excessive or lacking, (whether the refrigerant is concentrated into the first or second evaporator 150 or 160) on the basis of the inlet/outlet temperature difference of the first evaporator 150 and the inlet/outlet temperature difference of the second evaporator 160.

For example, whether the amount of refrigerant flowing into the first or second evaporator 150 or 160 is excessive or lacking may be determined on the basis of the inlet/outlet temperature difference of the first evaporator 150, the inlet/outlet temperature difference of the second evaporator 160, or a ratio of the inlet/outlet temperature differences of the first and second evaporators 150 and 160 (S19).

The determination method will be described hereinafter. As an example of the determination method, it may be determined whether the refrigerant is concentrated according to whether the inlet/outlet temperature difference of the first evaporator 150 is equal to or greater or less than a preset reference valve.

The refrigerant circulated into the refrigeration cycle may be divided into the first and second evaporators 150 and 160 through the flow adjusting part 130 to flow. When the inlet/outlet temperature difference of the first evaporator 150 is detected, a rate of the refrigerant passing through the first evaporator 150 may be determined. A rate of the refrigerant passing through the second evaporator 160 may be determined on the basis of the rate of the refrigerant passing through the first evaporator 150.

For example, when the inlet/outlet temperature difference of the first evaporator 150 is greater than the reference value, it may be determined that an amount of refrigerant is lacking. On the other hand, it may be recognized that an amount of refrigerant flowing into the second evaporator 160 is relatively large.

In the current embodiment, a method for determining a refrigerant concentration phenomenon by using the inlet/outlet temperature difference of the first evaporator 150 will be described. The refrigerant concentration phenomenon may also be determined by using the inlet/outlet temperature difference of the second evaporator 160.

If the inlet/outlet temperature difference of the first evaporator 150 is equal to the preset reference value (a reference temperature), it may be determined that the refrigerant concentration into the first or second evaporator 150 or 160 may not occur. In this case, the process may return to the operation S14, and then the flow adjustment part 130 is controlled on the basis of the time value that is set when the simultaneous cooling operation starts. Each of the adjusted states according to the cases 1 and 2 may be maintained for about 90 seconds. Thereafter, the operations S15 to S18 may be performed again.

On the other hand, if the inlet/outlet temperature difference of the first evaporator 150 is not equal to the preset reference value or is greater or less than the reference value, a determination is made in regard to the refrigerant concentration into the first or second evaporator 150 or 160 occurs.

For example, if the inlet/outlet temperature difference of the first evaporator 150 is less than the preset reference value, it may be determined that a relatively large amount of refrigerant passes through the first evaporator 150. In other words, it may be determined that the refrigerant concentration into the first evaporator 150 occurs.

This case may correspond to the "the occurrence of the refrigerant concentration in the first evaporator" shown in Table 1, and thus, the control state according to the case 1 may be maintained for about 90 seconds, and the control state according to the case 2 may increase to about 120 seconds. Since the adjusting time according to the case 2 increases in preparation for the "simultaneous cooling operation start", an amount of refrigerant introduced into the first evaporator 150 may relatively decrease (S20 and S21).

On the other hand, if the inlet/outlet temperature difference of the first evaporator 150 is greater than the preset reference value, it may be determined that a relatively small amount of refrigerant passes through the first evaporator 150. In other words, it may be determined that the refrigerant concentration into the second evaporator 160 occurs.

This case may correspond to the "the occurrence of the refrigerant concentration in the first evaporator" shown in Table 1, and thus, the control state according to the case 2 may be maintained for about 90 seconds, and the control state according to the case 2 may decrease to about 60 seconds. That is, since the adjusting time of the flow adjustment part 130 and the first and second flow rate adjustment parts 251 and 253 according to the case 2 decreases in preparation for the "simultaneous cooling operation start", an amount of refrigerant introduced into the first evaporator 150 may relatively increase (S23 and S24).

When the control times of the flow adjustment part 130 and the first and second flow rate adjustment parts 251 and 253 change by the above-described method, the processes after the operation S14 may be performed again on the basis of the changed control time value unless the refrigerator is turned off (S22).

As described above, since the control times of the flow adjustment part 130 and the first and second flow rate adjustment parts 251 and 253 change on the basis of the information with respect to the inlet and outlet temperature difference of the first and second evaporators 150 and 160, the refrigerant concentration in the first and second evaporators 150 and 160 may be prevented.

As another example of the determination method in operation S19, it may be determined whether the refrigerant is concentrated according to whether the inlet/outlet temperature difference of the first evaporator 150 is equal to or is greater or less than a first set valve. For example, the first set value may be 1.

When a ratio of the inlet/outlet temperature difference of the first evaporator 150 to the inlet/outlet temperature difference of the second evaporator 160 is 1, i.e., the inlet/outlet temperature differences of the first and second evaporators 150 and 160 are the same, it may be determined that the refrigerant concentration phenomenon does not occur in the first or second evaporator 150 or 160.

On the other hand, when a ratio of the inlet/outlet temperature difference of the first evaporator 150 to the inlet/outlet temperature difference of the second evaporator 160 is greater than 1, i.e., the inlet/outlet temperature difference of the first evaporator 150 is greater than that of the second evaporator 160, it may be determined that the refrigerant concentration phenomenon does not occur in the second evaporator 160.

When a ratio of the inlet/outlet temperature difference of the first evaporator 150 to the inlet/outlet temperature difference of the second evaporator 160 is greater than 1, i.e., the inlet/outlet temperature difference of the first evaporator 150 is greater than that of the second evaporator 160, it may be determined that the refrigerant concentration phenomenon does not occur in the second evaporator 150.

As further another example of the determination method in the operation S19, it may be determined whether the refrigerant is concentrated according to whether a difference value between the inlet/outlet temperature difference of the first evaporator 150 and the inlet/outlet temperature difference of the second evaporator 160 is equal to a second set value, or is greater or less than the second set value. For example, the first set value may be 0.

When a value obtained by subtracting the inlet/outlet temperature difference of the second evaporator 160 from the inlet/outlet temperature difference of the first evaporator 150 is 0, i.e., the inlet/outlet temperature differences of the first and second evaporators 150 and 160 are the same, it may be determined that the refrigerant concentration phenomenon does not occur in the first or second evaporator 150 or 160.

On the other hand, when a ratio of the inlet/outlet temperature difference of the first evaporator 150 to the inlet/outlet temperature difference of the second evaporator 160 is greater than 1, i.e., the inlet/outlet temperature difference of the first evaporator 150 is greater than that of the second evaporator 160, it may be determined that the refrigerant concentration phenomenon does not occur in the second evaporator 160.

When a ratio of the inlet/outlet temperature difference of the first evaporator 150 to the inlet/outlet temperature difference of the second evaporator 160 is less than 0, i.e., the inlet/outlet temperature difference of the first evaporator 150 is less than that of the second evaporator 160, it may be determined that the refrigerant concentration phenomenon does not occur in the first evaporator 150.

As described, since the opening degree of each of the flow adjustment part 130 and the first and second flow rate adjustment parts 251 and 253 is controlled to adjust an amount of refrigerant passing through the first and second refrigerant passages 101 and 103, the refrigerant concentration into the first or second evaporator 150 or 160 may be prevented to improve the cooling efficiency and reduce power consumption.

Since the refrigerant discharged from the low-pressure compressor and the refrigerant flowing into the evaporator are heat-exchanged with each other, the refrigerant suctioned into the high-pressure compressor may be reduced in suction superheating degree. Since the suction superheating degree is improved, the load applied into the compressor may be reduced to decrease the power consumption.

Since the refrigerant flowing into the expansion device and the refrigerant of the evaporator are heat-exchanged with each other, the refrigerant introduced into the evaporator may be reduced in dryness fraction to improve efficiency of the evaporator.

Since a predetermined refrigerant tube that is heat-exchanged with the evaporator, i.e., the low-pressure discharge tube or the suction pipe assembly is inserted into the evaporator, the predetermined refrigerant tube and the refrigerant tube of the evaporator may be effectively heat-exchanged with each other.

Since an amount of refrigerant supplied into the plurality of evaporators is adjustable on the basis of the previously determined time value and the inlet and outlet temperature difference of the plurality of evaporators while the refrigerant operates, the distribution of the refrigerant into the plurality of evaporators may be effectively realized.

As a result, the first control process for increasing an amount of refrigerant supplied into one evaporator of the plurality of evaporators and the second control process for increasing an amount of refrigerant supplied into the other evaporator of the plurality of evaporators may be basically performed according to the time period that is set during the simultaneous cooling operation.

Since the inlet and outlet temperature information of the first and second evaporators are confirmed to change the control time values in the first and second control processes, the refrigerant concentration into a specific evaporator of the plurality of evaporators may be prevented to realize the precision control.

Since the flow rate adjustment part of which an opening degree is adjustable is provided in the plurality of refrigerant passages, the flow rate of the refrigerant may be accurately controlled.

Embodiments provide a refrigerator that is improved in suction superheating degree and supercooling degree of a refrigeration cycle.

In one embodiment, a refrigerator includes: a compressor compressing a refrigerant; a condenser condensing the refrigerant compressed in the compressor; a refrigerant tube guiding a flow of the refrigerant condensed in the condenser; an expansion device decompressing the refrigerant condensed in the condenser; and an evaporator evaporating the refrigerant decompressed in the expansion device, wherein the evaporator includes: an evaporation tube through which the refrigerant decompressed in the expansion device flows; a coupling tube through a refrigerant heat-exchanged with the refrigerant of the evaporator flows; and a heat-exchange fin coupled to the evaporation tube and the coupling tube.

The coupling tube may include a tube through which the refrigerant compressed in the compressor flows.

The compressor may include a first compressor and a second compressor, and one-stage compressed refrigerant discharged from the second compressor may be heat-exchanged with the evaporator, suctioned into the first compressor, and two-stage compressed.

The evaporator may include a first evaporator coupled to the coupling tube and a second evaporator provided at one side of the first evaporator, the refrigerant evaporated in the second evaporator may be suctioned into the second compressor, and the refrigerant discharged from the second evaporator may flow into the coupling tube of the first evaporator.

The refrigerant evaporated in the first evaporator may be mixed with the refrigerant flowing into the coupling tube.

The coupling tube may include a suction assembly including the expansion device and a suction tube guiding the refrigerant passing through the evaporator into the compressor.

The suction tube may be coupled to the expansion device through a coupling part.

The coupling part may be formed by soldering.

The evaporator may include a first evaporator and a second evaporator, and the suction assembly may include: a first suction assembly coupled to the first evaporator; and a second suction assembly coupled to the second evaporator.

The compressor may include: a first compressor coupled to the first suction tube of a first suction tube of the first suction assembly; and a second compressor coupled to a second suction tube of the second suction assembly, and the refrigerant compressed in the second compressor is mixed with the refrigerant of the first suction tube.

The refrigerator may further include a main body defining a storage compartment, the main body including an outer case, an inner case, and an insulation material, wherein the coupling tube may be disposed between the evaporator and the insulation material.

The suction tube may be disposed on one side of the inner case, and the expansion device may be coupled to the evaporator.

The heat-exchange fin may include: a first insertion part coupled to the evaporation tube; and a second insertion part coupled to the coupling tube.

The second insertion part may include at least one of a through-hole through which the coupling tube passes and a recess part in which at least one portion of the heat-exchange fin is recessed.

The evaporator may include a first evaporator and a second evaporator, and the refrigerator may further include: first and second refrigerant passages branched from the refrigerant tube to guide the refrigerant into the first and second evaporators; and a flow adjustment part disposed on a branch part that is branched into the first and second refrigerant passages to adjust a flow rate of the refrigerant.

The refrigerator may further include: a temperature sensor detecting temperatures of an inlet and outlet of the first evaporator and temperatures of an inlet and outlet of the second evaporator; a memory in which information with respect to a control time according to a variation in amount of refrigerant flowing into the first refrigerant passage or the second refrigerant passage is mapped and stored; and a control unit controlling the supply of the refrigerant into the first and second evaporators on the basis of the information mapped in the memory, wherein a change in control time may be determined on the basis of the information detected by the temperature sensor.

The information with respect to the control time may include: information with respect to a first set-up time at which an amount of refrigerant supplied into the first evaporator increases to prevent the refrigerant from being concentrated into the second evaporator; and information with respect to a second set-up time at which an amount of refrigerant supplied into the second evaporator to prevent the refrigerant from being concentrated into the first evaporator.

The control unit may increase the second set-up time when the refrigerant concentration into the first evaporator is determined and decrease the second set-up time when the refrigerant concentration into the second evaporator is determined according to the information detected by the temperature sensor.

The refrigerator may further include: a first flow rate adjustment part disposed in the first refrigerant passage; and a second flow rate adjustment part disposed in the second refrigerant passage, wherein the information with respect to the control time may include time information with respect to operation states of the flow adjustment part and the first and second flow rate adjustment parts.

An opening degree of the first flow adjustment part may be maintained so that the opening degree of the first flow adjustment part is greater than that of the second flow adjustment part to increase an amount of refrigerant supplied into the first evaporator, and an opening degree of the second flow adjustment part may be maintained so that the opening degree of the second flow adjustment part is greater than that of the first flow adjustment part to increase an amount of refrigerant supplied into the second evaporator.

This application is related to U.S. application Ser. No. 14/531,426 filed on Nov. 3, 2014, whose entire disclosure is incorporated herein by reference.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
a plurality of compressors configured to compress a refrigerant and including a first compressor and a second compressor;
a condenser configured to condense the refrigerant compressed in the compressor;
a refrigerant tube to guide a flow of the refrigerant condensed in the condenser;
an expansion device configured to decompress the refrigerant condensed in the condenser; and
an evaporator configured to evaporate the refrigerant decompressed in the expansion device, wherein the evaporator includes:
an evaporation tube through which the refrigerant decompressed in the expansion device flows,
a coupling tube through which one-stage compressed refrigerant discharged from the second compressor flows, and
a heat-exchange fin coupled to the evaporation tube and the coupling tube, and
wherein the one-stage compressed refrigerant in the coupling tube is heat-exchanged with the refrigerant of the evaporation tube, suctioned into the first compressor, and two-stage compressed.

2. The refrigerator of claim 1, wherein the evaporator comprises a first evaporator coupled to the coupling tube and a second evaporator provided at one side of the first evaporator,
the refrigerant evaporated in the second evaporator is suctioned into the second compressor, and
the refrigerant discharged from the second evaporator flows into the coupling tube of the first evaporator.

3. The refrigerator of claim 2, wherein the refrigerant evaporated in the first evaporator is mixed with the refrigerant flowing into the coupling tube.

4. The refrigerator of claim 1, wherein the coupling tube comprises a suction assembly including the expansion device and a suction tube guiding the refrigerant passing through the evaporator into the compressor.

5. The refrigerator of claim 4, wherein the suction tube is coupled to the expansion device through a coupling part.

6. The refrigerator of claim 5, wherein the coupling part is formed by soldering.

7. The refrigerator of claim 4, wherein the evaporator includes a first evaporator and a second evaporator, and the suction assembly includes a first suction assembly coupled to the first evaporator, and a second suction assembly coupled to the second evaporator.

8. The refrigerator of claim 7, wherein the compressor comprises a first compressor coupled to the first suction tube of a first suction tube of the first suction assembly, and a second compressor coupled to a second suction tube of the second suction assembly, the refrigerant compressed in the second compressor being mixed with the refrigerant of the first suction tube.

9. The refrigerator of claim 4, further comprising a main body defining a storage compartment, the main body including an outer case, an inner case, and an insulation material, wherein the coupling tube is provided between the evaporator and the insulation material.

10. The refrigerator of claim 9, wherein the suction tube is provided on one side of the inner case, and the expansion device is coupled to the evaporator.

11. The refrigerator of claim 1, wherein the evaporator includes a first evaporator and a second evaporator, and the refrigerator further comprises first and second refrigerant passages branched from the refrigerant tube to guide the refrigerant into the first and second evaporators, and a flow adjustment part disposed on a branch part that is branched into the first and second refrigerant passages to adjust a flow rate of the refrigerant.

12. The refrigerator of claim 11, further comprising:
a temperature sensor detecting temperatures of an inlet and outlet of the first evaporator and temperatures of an inlet and outlet of the second evaporator;
a memory in which information with respect to a control time of a variation in amount of refrigerant flowing into the first refrigerant passage or the second refrigerant passage is mapped and stored; and
a control unit configured to control the supply of the refrigerant into the first and second evaporators on the basis of the information mapped in the memory,
wherein the control unit determines whether control time is changed on the basis of the information detected by the temperature sensor.

13. The refrigerator of claim 12, wherein the information with respect to the control time comprises:
information with respect to a first set-up time at which an amount of refrigerant supplied into the first evaporator increases to prevent the refrigerant from being concentrated into the second evaporator; and
information with respect to a second set-up time at which an amount of refrigerant supplied into the second evaporator increases to prevent the refrigerant from being concentrated into the first evaporator.

14. The refrigerator of claim 13, wherein the control unit increases the second set-up time when the refrigerant concentration into the first evaporator is determined and decreases the second set-up time when the refrigerant concentration into the second evaporator is determined of the information detected by the temperature sensor.

15. The refrigerator of claim 12, further comprising:
a first flow rate adjustment part disposed in the first refrigerant passage; and
a second flow rate adjustment part disposed in the second refrigerant passage,
wherein the information with respect to the control time comprises time information with respect to operation states of the flow adjustment part and the first and second flow rate adjustment parts.

16. The refrigerator of claim 15, wherein an opening degree of the first flow adjustment part is adjusted so that the opening degree of the first flow adjustment part is greater than that of the second flow adjustment part to increase an amount of refrigerant supplied into the first evaporator, and
an opening degree of the second flow adjustment part is adjusted so that the opening degree of the second flow adjustment part is greater than that of the first flow adjustment part to increase an amount of refrigerant supplied into the second evaporator.

17. A refrigerator comprising:
a compressor configured to compress a refrigerant;
a condenser configured to condense the refrigerant compressed in the compressor;
a refrigerant tube to guide a flow of the refrigerant condensed in the condenser;

an expansion device configured to decompress the refrigerant condensed in the condenser; and an evaporator configured to evaporate the refrigerant decompressed in the expansion device, wherein the evaporator includes:

an evaporation tube through which the refrigerant decompressed in the expansion device flows, a coupling tube through a refrigerant heat-exchanged with the refrigerant of the evaporator flows, and a heat-exchange fin coupled to the evaporation tube and the coupling tube, and wherein the heat-exchange fin includes a first insertion part in which the evaporation tube is coupled, and a second insertion part in which the coupling tube is coupled.

18. The refrigerator of claim 17, wherein the second insertion part comprises at least one of a through-hole through which the coupling tube passes and a recess part in which at least one portion of the heat-exchange fin is recessed.

* * * * *